No. 645,312. Patented Mar. 13, 1900.
A. DE DION & G. BOUTON.
FRICTION CLUTCH.
(Application filed June 17, 1899.)

(No Model.) 3 Sheets—Sheet 1.

No. 645,312. Patented Mar. 13, 1900.
A. DE DION & G. BOUTON.
FRICTION CLUTCH.
(Application filed June 17, 1899.)
(No Model.) 3 Sheets—Sheet 3.

UNITED STATES PATENT OFFICE.

ALBERT DE DION AND GEORGES BOUTON, OF PUTEAUX, FRANCE.

FRICTION-CLUTCH.

SPECIFICATION forming part of Letters Patent No. 645,312, dated March 13, 1900.

Application filed June 17, 1899. Serial No. 721,001. (No model.)

*To all whom it may concern:*

Be it known that we, ALBERT DE DION and GEORGES BOUTON, citizens of France, residing at Puteaux, in the Department of the Seine, France, have invented certain new and useful Improvements in Friction-Clutches, of which the following is a specification.

This invention relates to friction-clutches; and it consists in the peculiar construction and combination of parts, hereinafter more fully described and then particularly pointed out in the appended claims.

Figure 1:
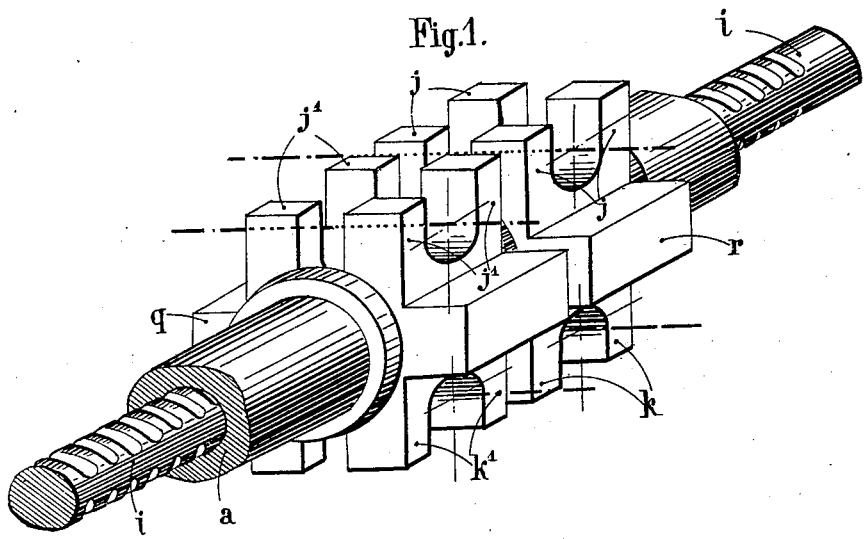
Figure 2:
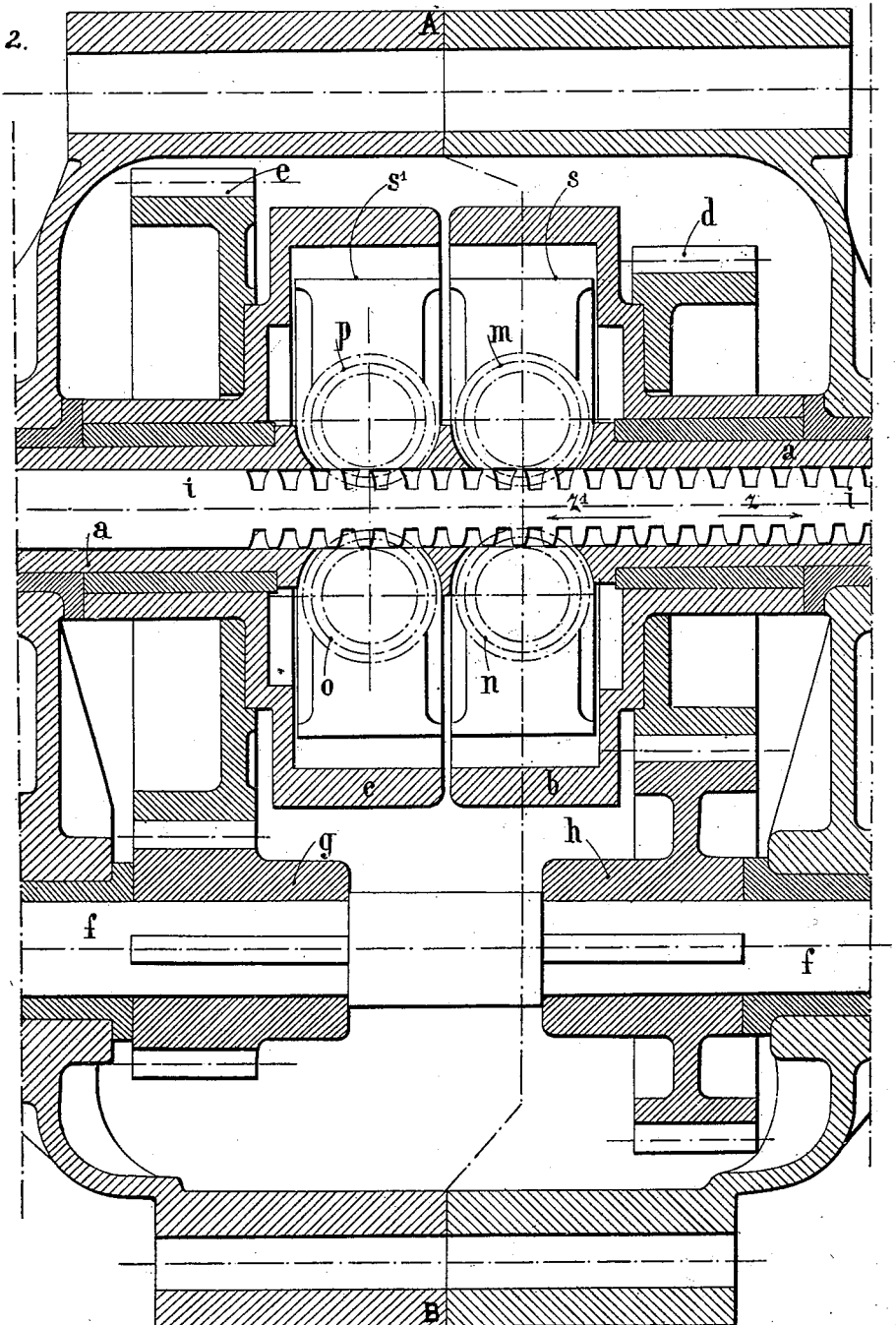
Figure 3:
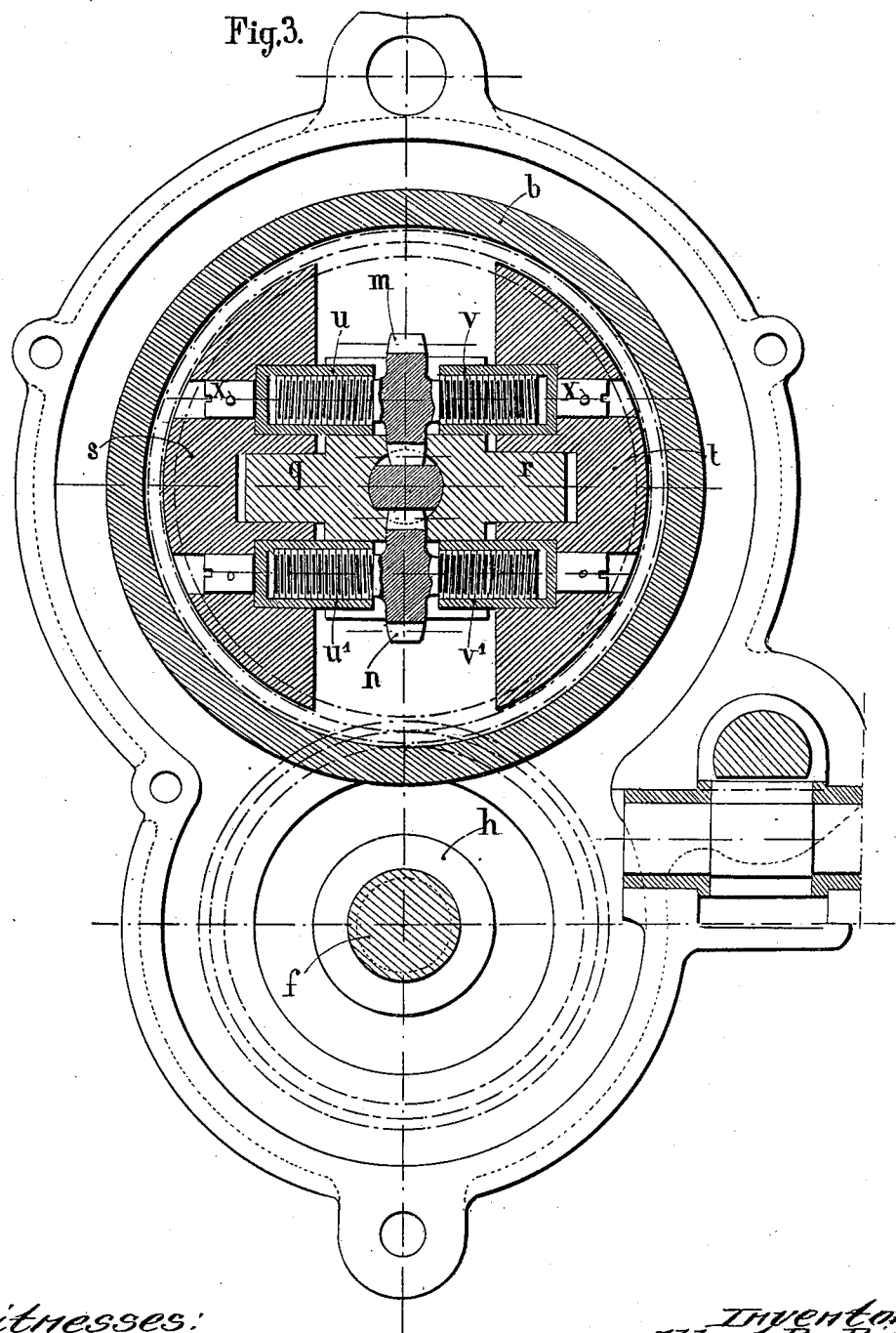

In the annexed drawings, Figure 1 is a perspective view of the essential portion of the transmission-shaft. Fig. 2 is a vertical section through the axis of the mechanism. Fig. 3 is a transverse section on the line A B of Fig. 2.

On the transmission-shaft $a$ revolve freely two sleeves $b$ $c$, on which are fixed, respectively, the toothed wheels $d$ and $e$ of different diameters, to which a continuous rotary movement is communicated by the driving-shaft $f$ through the medium of the pinions $g$ and $h$.

The shaft $a$ is hollow for a considerable portion of its length, and in it slides a cylindrical rod $i$, provided with a double row of teeth forming a rack, this latter being controlled by any system of levers placed within reach of the hand of the driver. The portion of the shaft on which the sleeves $b$ and $c$ are arranged is shown in perspective in Fig. 1. It assumes the form of a cross, the vertical arms of which are recessed so as to present a series of diametrically-opposite shoulders $j$ $j'$ and $k$ $k'$, serving as bearings for four pinions $m$ $n$ $o$ $p$, the teeth of which are in gear with the double rack $i$. On the other arms $q$ and $r$ of the cross are arranged the segments $s$ $s'$, Fig. 3, and $t$ $t'$, which are placed inside the sleeves $b$ and $c$. The ends of the axle of each of the pinions are screw-threaded in opposite directions and engage in ferrules $u$ $u'$ $v$ $v'$, partially sunk in the sectors $s$ $s'$ and $t$ $t'$, wherein they are securely held by pins $x$, passing through their heads.

We will now explain the working of our mechanism, considering only that portion of the clutch on the right of the axis of Fig. 2. Let us suppose the rack $i$ to be in its intermediate position. The sleeve $b$, turning freely on the shaft $a$, can only actuate this latter when its inner surface rubs against the segments $s$ and $t$. To effect this contact, the rack $i$ must be drawn in the direction of the arrow $z$. The pinions $m$ and $n$, which are in gear with the opposite teeth of the rack, will turn in a contrary direction to each other. Their axles (screw-threaded in opposite directions) by turning in the ferrules $u$ $u'$ $v$ $v'$ (the rotation of which is prevented by the pins $x$) will separate or retire from each other these ferrules $u$ $u'$ $v$ $v'$, which will actuate on so retiring the sectors $s$ and $t$, which are suitably guided by the shoulders $q$ and $r$ on the shaft $a$. It will be readily understood that in order to render the movement of these segments possible the ferrules $v$ $v'$, controlling, for instance, the segment $t$, must be tapped in contrary directions, since the two pinions $m$ and $n$ revolve in opposite directions. Directly the outer surfaces of the segments $s$ and $t$ come into contact with the inner wall of the sleeve $b$ the frictional working will be established progressively until the segments turn at the same speed as the latter, and as the segments are held fast on the shaft $a$ by means of the different shoulders above described, as well as by the pinions and their axles, this shaft will commence to turn.

Fig. 2 represents in section a clutch arranged for two different speeds. To this end we simply give to the toothed wheel $e$ of the sleeve $c$ a different diameter to that of the sleeve $b$. To shift from one speed to the other, the rack $i$ is slid in the direction of the arrow $z'$. The two segments $s$ and $t$ retire or separate from the sleeve $b$, while the two others, $s'$ $t'$, advance or come into contact with the sleeve $c$.

It is obvious that in the working of our clutch the functions of the organs or parts may be reversed—that is to say, the motor-shaft may actuate the shaft carrying the segments, and these segments will then transmit the movement to the sleeves.

We claim—

1. In a friction-clutch of the character described, a shaft having arms recessed to form diametrically-opposite shoulders, and arms at right angles to the recessed arms to engage segments, combined with sleeves loose upon said shaft, pinions fast upon the sleeves, segments within the sleeves, a rotatable shaft carrying the segments, pinions, a double rack, and connections between the segments and the axles of said pinions for transmitting motion to the shaft, substantially as specified.

2. The combination with the shaft and the shaft movable within the same and having a double rack, and arms recessed as described, of the sleeves loose upon said shaft, segments mounted on arms of the movable shaft, and disposed within said sleeves, pinions having bearings in recesses in arms of said shaft, and adapted to engage the said rack, and means connecting the segments and the axles of said pinions for transmitting motion from the pinions frictionally to the shaft, as set forth.

In testimony whereof we have hereunto set our hands in presence of two subscribing witnesses.

ALBERT DE DION.
GEORGES BOUTON.

Witnesses:
EDWARD P. MACLEAN,
ALFRED FREY.